E. O. SCHWEITZER.
BRUSH FOR DYNAMO ELECTRIC MACHINES AND THE LIKE.
APPLICATION FILED MAR. 5, 1909.
974,833.
Patented Nov. 8, 1910.
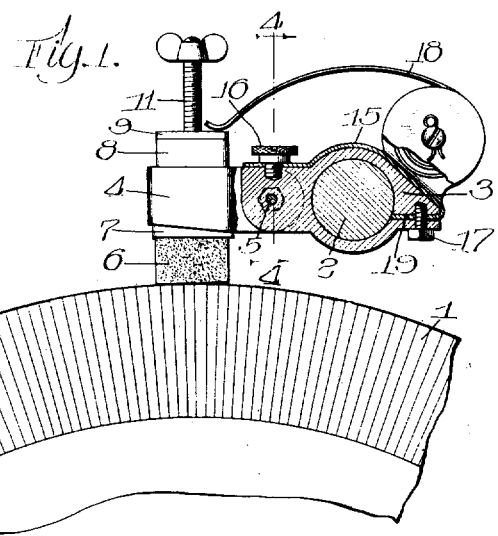
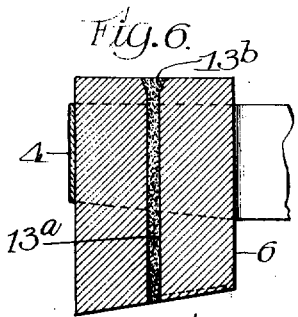
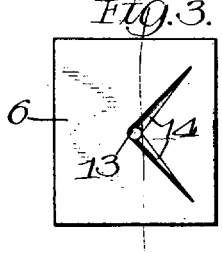
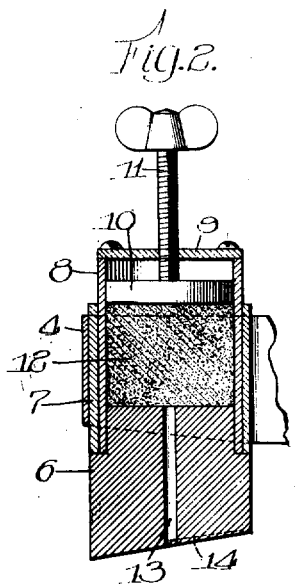
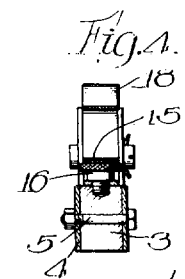
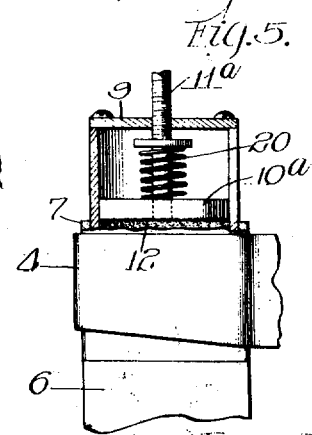
Witnesses:
Inventor:
Edmund O. Schweitzer

UNITED STATES PATENT OFFICE.

EDMUND O. SCHWEITZER, OF CHICAGO, ILLINOIS.

BRUSH FOR DYNAMO-ELECTRIC MACHINES AND THE LIKE.

974,833.   Specification of Letters Patent.   Patented Nov. 8, 1910

Application filed March 5, 1909. Serial No. 481,404.

*To all whom it may concern:*

Be it known that I, EDMUND O. SCHWEITZER, citizen of the United States, residing at Chicago, in the county of Cook and State of Illinois, have invented a certain new and useful Improvement in Brushes for Dynamo-Electric Machines and the Like, of which the following is a full, clear, concise, and exact description, reference being had to the accompanying drawings, forming a part of this specification.

My invention relates to brushes for dynamo electric machine commutators and collector rings and the like.

Prominent objects of my invention are: to provide a simple, practical and effective form of brush of the class specified; to prevent undesirable cutting of the commutator or collector ring by the brush; to afford lubrication for the brush and moving member; to increase the resistance of the brush to a desirable extent; and to accomplish the foregoing and other desirable results in a simple and expeditious manner.

In carrying out my invention in the way herein set forth, I provide a brush of the class specified, and associate with the same means for supplying the brush surface with viscous, lubricating compound, which may be made of powdered graphite and oil, or any other suitable mixture. In this way, the surface of the brush is lubricated, and undesirable cutting is avoided, and other desirable results obtained, more particularly specified.

In the accompanying drawings—Figure 1 is a view, largely in section, of a portion of a dynamo commutator, and a brush therefor embodying my invention; Fig. 2 is a cross section of the brush proper; Fig. 3 is a view of the surface of the brush; Fig. 4 is a transverse section on the line 4—4 in Fig. 1; Fig. 5 is a view of a modified form of device.

In the drawings (Figs. 1 to 4) I have shown a commutator 1 of some dynamo electric machine having a brush-supporting rod or arm 2, which is understood to be rigidly fixed to the brush-supporting member of the dynamo in the usual way. Upon this arm 2 is mounted a frame 3, which is fixed upon the arm 2 with considerable tightness. At the end of the frame 3, a brush-holder 4 is pivotally connected by a pivot-bolt 5. This brush-holder contains a brush 6, shown as a graphite or carbon brush, provided at its upper end with a band or collar 7, fitting in the brush-holder 4. At the top of the brush, and within the band 7, is a cylinder member 8, having a removable head 9, and containing a piston 10 controlled by a winged screw 11. Within the cylinder 8 is a viscous, lubricating compound 12, of any suitable kind—preferably, a mixture of graphite and oil. The brush 6 is provided with a duct or passage 13, leading down from the chamber or cylinder 8 to the surface of the brush, and the latter is desirably provided with one or more grooves or channels 14, 14 (Fig. 3).

The frame 3 is provided with a spring attachment 15, in the form of a strip surrounding said frame, and held in place by nuts 16 and 17, and carrying a spring 18, which acts upon the head 9 of the cylinder 8, so as to hold the bolt normally upon the commutator. The screw 17 also serves to tighten a gap or crack 19 in the frame 3, to tighten said frame and the brush upon the arm 2.

It will be seen that the viscous lubricating compound will work through the passage 13 to the surface of the brush, and will serve to lubricate the brush and commutator and prevent cutting and wearing of both, and also prevent noise, dust, and other undesirable results. Pressure can be exerted upon the lubricating compound by turning the screw 11 to force the piston down as desired. The use of oil in connection with graphite increases the resistance of the brush to a desirable degree, but not to an undesirable degree.

In Fig. 5 I have shown an arrangement in which the piston slides loosely on the stem or spindle 11ª, which is surrounded by a coil spring 20, acting upon the piston 10ª. The spring continually applies pressure upon the piston, and this pressure is varied by turning the threaded spindle 11ª so as to compress the spring more.

In Fig. 6 I show an arrangement in which the brush has a channel 13ª with a cup-shaped opening 13ᵇ at the top, so that the viscous material can simply be poured into it, and then allowed to run or trickle down onto the commutator, or be pushed down, if need be, by a pencil or small rod, or something of the sort.

It will be understood that changes and modifications can be made without departing from the spirit of the invention

What I claim is:

1. A device of the class specified comprising a brush, a cylinder applied to the upper end of said brush, the brush having a passage extending from the chamber of said cylinder to the surface of the brush, a piston in said cylinder and a threaded member for use in connection with said piston.

2. A device of the class specified comprising a carbon brush having its upper end provided with a metal band and having a passage extending from one end to the other and grooves in the bearing surface communicating with said passage; a cylinder attached to the upper end of the brush within said metal band, having its chamber communicating with the other end of said passage, a piston within said cylinder, a removable head for said piston, and a winged screw threaded through said head and extended to said piston.

3. A device of the class specified comprising a brush having a chamber for lubricating compound, and a passage leading therefrom to the wearing surface, and spring means for forcing said compound from the chamber.

4. A device of the class specified comprising a brush having a cylinder for lubricating compound and a passage leading therefrom to the wearing surface of the brush, a piston in said cylinder and a spring acting upon said piston.

5. A device of the class specified comprising a brush having a cylinder for lubricating compound and a passage leading therefrom to the wearing surface of the brush, a piston in said cylinder, a spring acting upon said piston and a stem or spindle having threaded connections with the cylinder head and connected with said spring so that by turning the spindle the spring will be tightened.

In witness whereof, I hereunto subscribe my name this 19th day of February A. D., 1909.

EDMUND O. SCHWEITZER.

Witnesses:
A. MILLER BELFIELD,
JAMES ELLIOTT.